(12) United States Patent
Nakayama

(10) Patent No.: US 9,083,098 B2
(45) Date of Patent: Jul. 14, 2015

(54) BATTERY WIRING MODULE

(71) Applicants: AUTONETWORKS TECHNOLOGIES, LTD, Yokkaichi, Mie (JP); SUMITOMO WIRING SYSTEMS, LTD., Yokkaichi, Mie (JP); SUMITOMO ELECTRIC INDUSTRIES, LTD., Osaka-shi, Osaka (JP)

(72) Inventor: Osamu Nakayama, Yokkaichi (JP)

(73) Assignees: AutoNetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 14/363,540

(22) PCT Filed: Nov. 20, 2012

(86) PCT No.: PCT/JP2012/080043
§ 371 (c)(1),
(2) Date: Jun. 6, 2014

(87) PCT Pub. No.: WO2013/084713
PCT Pub. Date: Jun. 13, 2013

(65) Prior Publication Data
US 2014/0322982 A1    Oct. 30, 2014

(30) Foreign Application Priority Data
Dec. 6, 2011  (JP) .................................. 2011-266892

(51) Int. Cl.
*H01R 24/00* (2011.01)
*H01R 11/28* (2006.01)
*H01M 2/20* (2006.01)

(52) U.S. Cl.
CPC ............... *H01R 11/288* (2013.01); *H01M 2/20* (2013.01); *H01M 2/206* (2013.01)

(58) Field of Classification Search
CPC ....... H01R 11/288; H01M 2/20; H01M 2/206
USPC .................................................. 439/500, 627
See application file for complete search history.

(56) References Cited

U.S. PATENT DOCUMENTS

| 8,998,646 B2 * | 4/2015 | Okamoto et al. ............. 439/627 |
| 2011/0008669 A1 | 1/2011 | Ogasawara et al. |

(Continued)

FOREIGN PATENT DOCUMENTS

| EP | 2 685 526 A1 | 1/2014 |
| EP | 2 713 421 A1 | 4/2014 |

(Continued)

OTHER PUBLICATIONS

International Search Report issued in International Patent Application No. PCT/JP2012/080043 dated Jan. 15, 2013.

(Continued)

*Primary Examiner* — Khiem Nguyen
(74) *Attorney, Agent, or Firm* — Oliff PLC

(57) ABSTRACT

A battery wiring module including first connecting members that connect adjacent electrode terminals of a plurality of electric cells to serially connect the plurality of electric cells; second connecting members, one end of each of which is connected to the electrode terminal at one end of the serial connection and the other end of each of which is connected to an external conductive member; and a resin protector that holds the first connecting members and the second connecting members. The resin protector includes first holding portions that hold the first connecting members and second holding portions that hold the second connecting members. Concave engaged portions are provided in the second connecting members and convex engaging portions are provided in the second holding portions for engaging the concave engaged portions to limit the movement of the second connecting members.

7 Claims, 7 Drawing Sheets

(56) References Cited

U.S. PATENT DOCUMENTS

2011/0020686 A1    1/2011    Yamamoto et al.
2013/0161053 A1    6/2013    Okamoto et al.

FOREIGN PATENT DOCUMENTS

| | | |
|---|---|---|
| JP | A-2000-223098 | 8/2000 |
| JP | A-2003-100267 | 4/2003 |
| JP | A-2009-289429 | 12/2009 |
| JP | A-2010-205509 | 9/2010 |
| JP | A-2010-225583 | 10/2010 |
| JP | A-2011-18499 | 1/2011 |
| JP | 2011-124176 A | 6/2011 |
| JP | A-2011-181453 | 9/2011 |
| WO | 2012/036317 A1 | 3/2012 |

OTHER PUBLICATIONS

Feb. 27, 2015 European Search Report issued in European Application No. 12856481.2.

* cited by examiner

BATTERY WIRING MODULE

TECHNICAL FIELD

The present invention relates to battery wiring modules.

BACKGROUND ART

In a battery module for electric cars or hybrid cars, a plurality of electric cells having positive and negative electrode terminals are arranged in a plurality of rows. The plurality of electric cells are connected in series by connecting the electrode terminals of electric cells adjacent to each other with connecting members.

In JP 2011-181453A, by attaching a battery connecting assembly to a plurality of electric cells, a plurality of connecting members are mounted between adjacent electrode terminals so as to connect the plurality of electric cells in series.

In this battery connecting assembly, each connecting member is accommodated in a connecting member accommodating portion in which the connecting member is fitted between walls and positioned in the direction of its connection.

SUMMARY OF INVENTION

Technical Problem

Among the plurality of connecting members of a battery connecting assembly connected to a plurality of linearly arranged electric cells, generally, the connecting members connected to the electrode terminals at the ends of the serial connection are often connected to a connecting member of a separate battery connecting assembly or the terminal, etc., connected to an external device. Accordingly, such connecting members tend to have different shapes from the other connecting members, such that high dimensional accuracy in positioning these connecting members cannot be easily achieved if both sides of the connecting members are sandwiched between walls for their positioning. Furthermore, the connecting members connected to the electrode terminals at the ends of the serial connection tend to be elongated in order to connect to other members, which makes the connecting members susceptible to errors in dimensional accuracy.

The present invention has been completed in light of the above-described circumstances and its object is to provide a battery wiring module capable of achieving high accuracy in positioning the connecting members connected to the electrode terminals at the ends of the serial connection of electric cells arranged in a plurality of rows.

Solution to Problem

A battery wiring module is characterized by comprising: first connecting members that connect adjacent positive and negative electrode terminals of a plurality of electric cells to serially connect the plurality of electric cells; second connecting members, one end of each of which is connected to the electrode terminal at one end of the serial connection and the other end of each of which is connected to an external conductive member; and a resin protector that holds the first connecting members and the second connecting members, wherein the resin protector includes first holding portions that hold the first connecting members, and second holding portions that hold the second connecting members, and wherein engaged portions are provided in the second connecting members and engaging portions are provided in the second holding portions for engaging the engaged portions to limit the movement of the second connecting members.

If connecting members are connected to external conductive members as in the case of the second connecting members and, for example, if the second connecting members are positioned at the end edges of the second connecting members located in the direction of their connection, the structure tends to be too complicated to achieve high dimensional accuracy. In addition, such connecting members tend to be longer in the direction of their connection than the first connecting members and thus susceptible to larger dimensional errors due to their greater length in the direction of their connection, which in turn requires larger dimensional tolerance.

According to the present structure, however, the movement of the second connecting members can be limited by the engagement between the engaging portions and the engaged portions. Therefore, even if the second connecting members are elongated, the present structure may achieve higher dimensional accuracy in their positioning with reference to the positions of the engaging portions and the engaged portions, compared with a structure in which the second connecting members are positioned by abutting the end edges of the second connecting members against the partition walls. This provides for achieving high dimensional accuracy in positioning the connecting members that are connected to the electrode terminals at the ends of the serial connection of the electric cells arranged in a plurality of rows.

Furthermore, according to the present structure, the second connecting members are positioned by the engagement between the engaging portions and the engaged portions. Therefore, the second connecting members can be positioned in the direction of their connection without extending the end edges of the second connecting members to the partition walls. As this shortens the second connecting members in the direction of their connection, the amount of material used for the second connecting members can be reduced.

Preferably, embodiments of the foregoing structure have the structures below.

The second holding portions includes a base plate on which a second connecting member is mounted and a partition wall that separates the second connecting member from the outside, and the engaged portions are provided in side edges, with respect to the connection direction, of the second connecting members and the engaging portions are provided in the partition walls.

This facilitates simplification of the structures of the second connecting members and the second holding portions, compared with, for example, the structure in which through-holes are provided in the second connecting members as engaged portions and pins protrude from the base plates as engaging portions to be inserted into the through-holes.

The engaged portions are cutouts formed by cutting out portions of the side edges of the second connecting members in the direction of their connection and the engaging portions protrude inwardly from the partition walls to correspond to the cutouts.

This can reduce the amount of material used for the second connecting members compared with the case in which convexes are formed on the second connecting members.

Insertion holes into which the electrode terminals or the shanks of bolts are inserted are formed in the second connecting members, and the engaged portions are formed adjacent to the insertion holes.

As this achieves high dimensional accuracy in positioning the second connecting members in the direction of their connection, it also achieves high dimensional accuracy in positioning the insertion holes. This can reduce the tolerance of the diameter of the insertion holes, thus reducing the electrical resistance between the electrode terminals and the second connecting members.

The engaged portions are formed within the diameter of the insertion holes in the direction of the connection of the second connecting members.

This allows for even higher dimensional accuracy in the positioning of the insertion holes.

The engaged portions have a circular shape and the midpoints of the engaged portions with respect to the direction of the connection of the second connecting members are aligned with the axial centers of the insertion holes.

This allows for even higher dimensional accuracy in the positioning of the insertion holes.

The engaging portions are not spaced apart any farther than a predetermined dimension on different sides of the electric cells with respect to the second connecting members.

In this way, even if the areas of the second connecting members (inside the partition walls surrounding the second connecting members) are made small, a tool for fastening the second connecting members is prevented from coming into contact with the engaging portions when the tool is brought within the partition wall.

Advantageous Effects of Invention

According to the present invention, in a battery wiring module, high dimensional accuracy can be achieved in the positioning of connecting members that are connected to the electrode terminals at the ends of the serial connection of electric cells arranged in a plurality of rows.

DESCRIPTION OF EMBODIMENTS

Embodiments

Embodiments of the present invention will be described hereinafter with reference to FIGS. 1-8.

Figure 1:
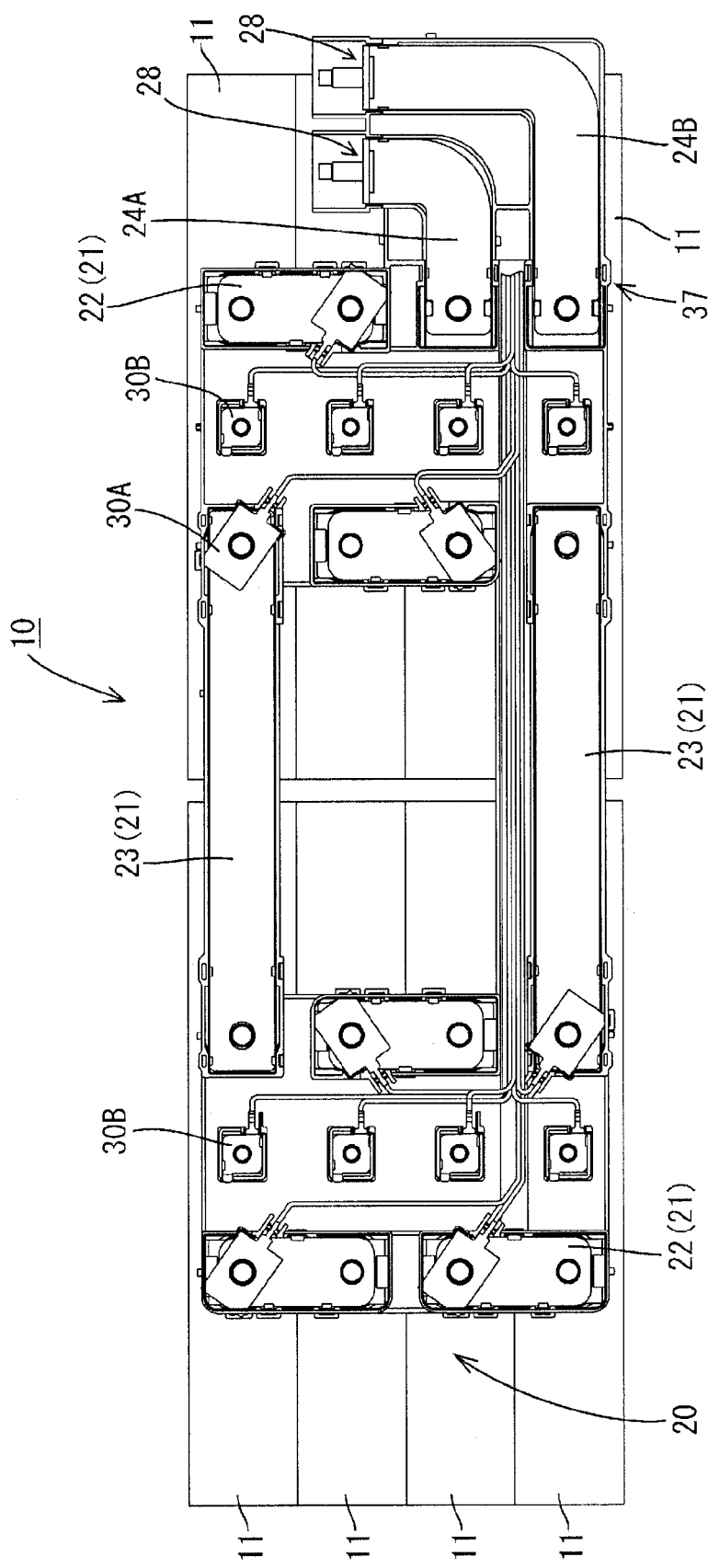
FIG. 1 is a plan view showing a battery module of the embodiment.
Figure 3:
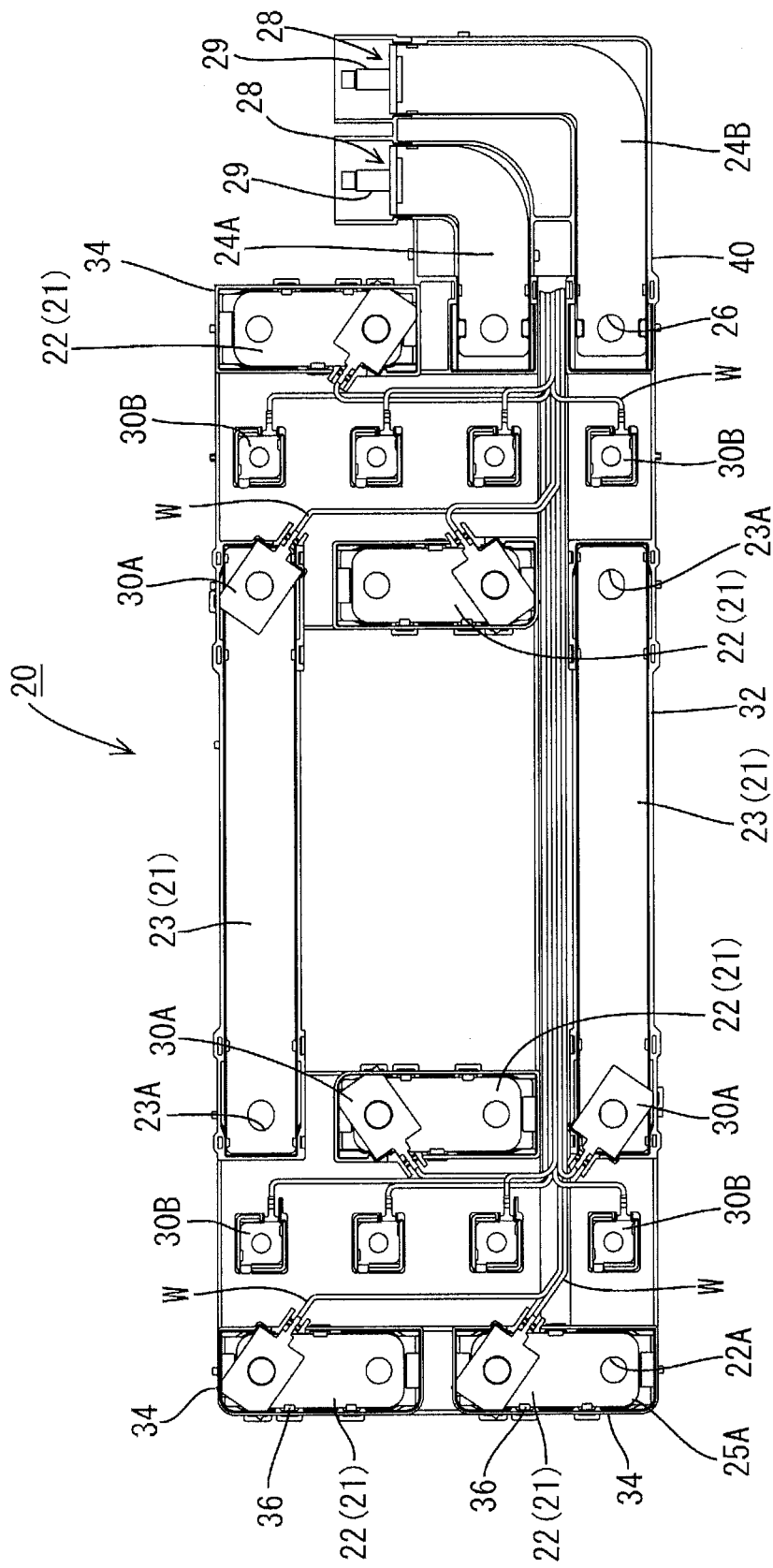
FIG. 3 is a plan view showing a battery wiring module.

A battery wiring module 20 according to the present embodiment connects adjacent electrode terminals 12A, 12B of electric cells 11 arranged in a plurality of rows with first connecting members 21. The battery module 10, to which this battery wiring module 20 is attached, is used, for example, as the power source of vehicles, such as electric cars or hybrid cars. Hereinafter, the direction out of the plane of FIG. 1 is referred to as "upward" and the direction into the plane of FIG. 1 is referred to as "downward". The direction to the bottom in FIG. 1 is referred to as "forward" and the direction to the top in FIG. 3 is referred to as "rearward".

(Battery Module)

Figure 2:
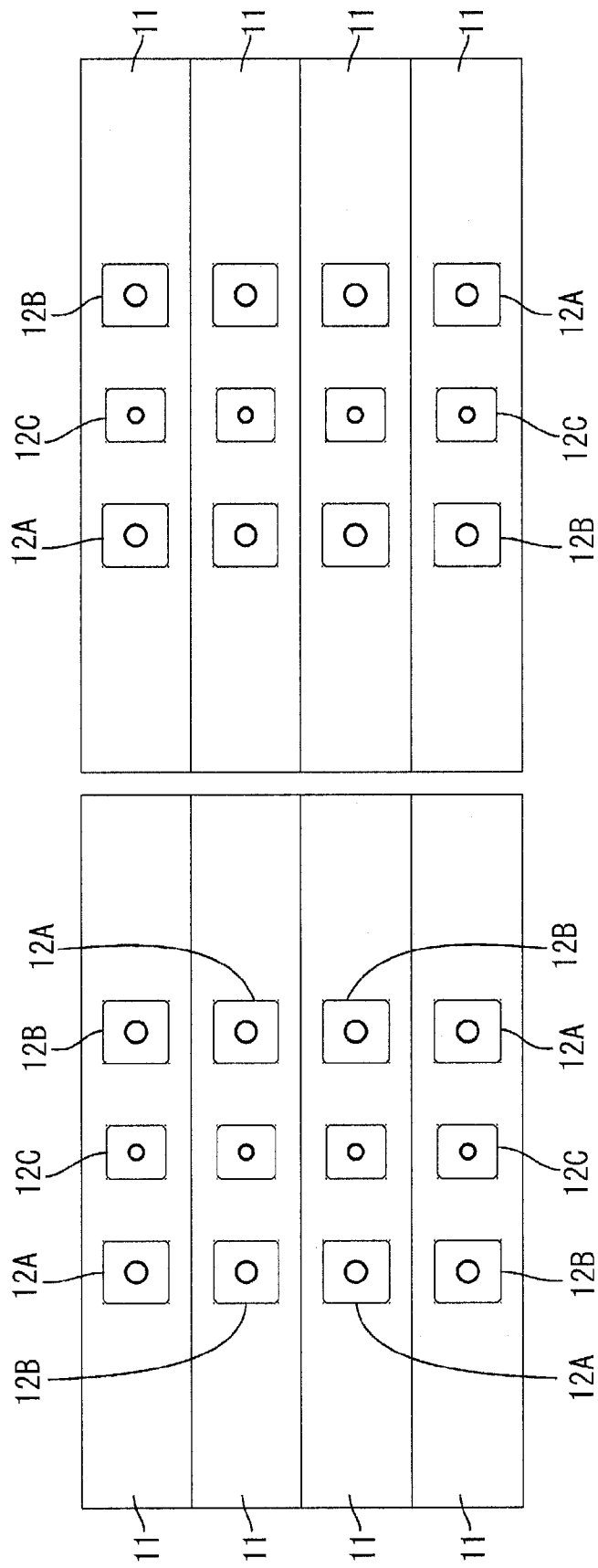
FIG. 2 is a plan view showing a plurality of electric cells arranged in rows.

As shown in FIGS. 1 and 2, the battery module 10 comprises, for example, eight (i.e., a plurality of) electric cells 11 and the battery wiring module 20 for connecting the eight electric cells 11.

(Electric Cells)

As shown in FIG. 2, the electric cells 11 include terminals 12A-12C vertically protruding from the upper surface of a main body having the shape of a flat rectangular solid that contains a power generation element (not shown).

The terminals 12A-12C consist of a pair of right and left electrode terminals 12A, 12B (12A is shown as the positive electrode and 12B as the negative electrode) and a voltage detection terminal 12C disposed between the pair of electrode terminals 12A, 12B. The voltage detection terminal 12C detects the voltage approximately at the midpoint between the electrode terminals 12A, 12B.

Each of the terminals 12A-12C is a prismatic nut (square nut) with a circular threaded hole formed therethrough at its center. The shanks of bolts are tightened into the threaded holes of these terminals 12A-12C to secure connecting members 21, 24A, and 24B and voltage detection terminals 30A, 30B to be described below.

The electric cells 11 are oriented so that adjacent electric terminals 12A, 12B have opposite polarities. The cell group consisting of the plurality of electric cells 11 is secured by retainer plates (not shown).

The eight electric cells 11 are arranged lengthwise in two rows (i.e., a plurality of rows) and stacked breadthwise in four tiers (i.e., a plurality of tiers), where "lengthwise" and "breadthwise" is with respect to the upper face of the electric cells 11.

(Battery Wiring Module)

As shown in FIG. 3, the battery wiring module 20 includes seven (i.e., a plurality of) first connecting members 21 that connect adjacent electrode terminals 12A, 12B of different electric cells 11, two (i.e., a plurality of) L-shaped second connecting members 24A, 24B connected to the electrode terminals 12A, 12B at the ends of the serial connection of the electric cells 11, a plurality of voltage detection terminals 30A, 30B connected to voltage detection wires W, and a resin protector 32 that accommodates the first connecting members 21, the second connecting members 24A, 24B, and the voltage detection terminals 30A, 30B.

(First Connecting Members)

The first connecting members 21 are made of, for example, metal, such as copper, copper alloy, stainless steel (SUS), and aluminum, and comprise short connecting members 22 that connect adjacent electrode terminals 12A, 12B of different electric cells 11 in the front-rear direction (the breadthwise direction of the upper surfaces of the electric cells 11) and long connecting members 23 that are longer than the short connecting members 22 and connect adjacent electrode terminals 12A, 12B of different electric cells 11 in the right-left direction (the lengthwise direction of the upper surfaces the electric cells 11).

The short connecting members 22 have a plate shape with a length corresponding to the dimension between the electrode terminals 12A, 12B adjacent to each other in the front-rear direction and include a pair of circular insertion holes 22A formed therethrough that the shanks of bolts are inserted into.

In the area of each short connecting member 22 within the partition wall 34 that surrounds the connecting member 22, the end edges (ends) of the short connecting member 22 located in the direction of the connection form trimmed portions 25A that create gaps with the partition wall 34. The trimmed portions 25A are formed by removing the areas through which relatively little electric current flows.

The long connecting members 23 have a plate shape with a length corresponding to the dimension between electrode terminals 12A, 12B adjacent to each other in the right-left direction and include a pair of insertion holes 23A into which the shanks of bolts are inserted.

The insertion holes 23A have an elliptical shape elongated in the right-left direction (the direction of connection).

(Second Connecting Members)

Figure 4:
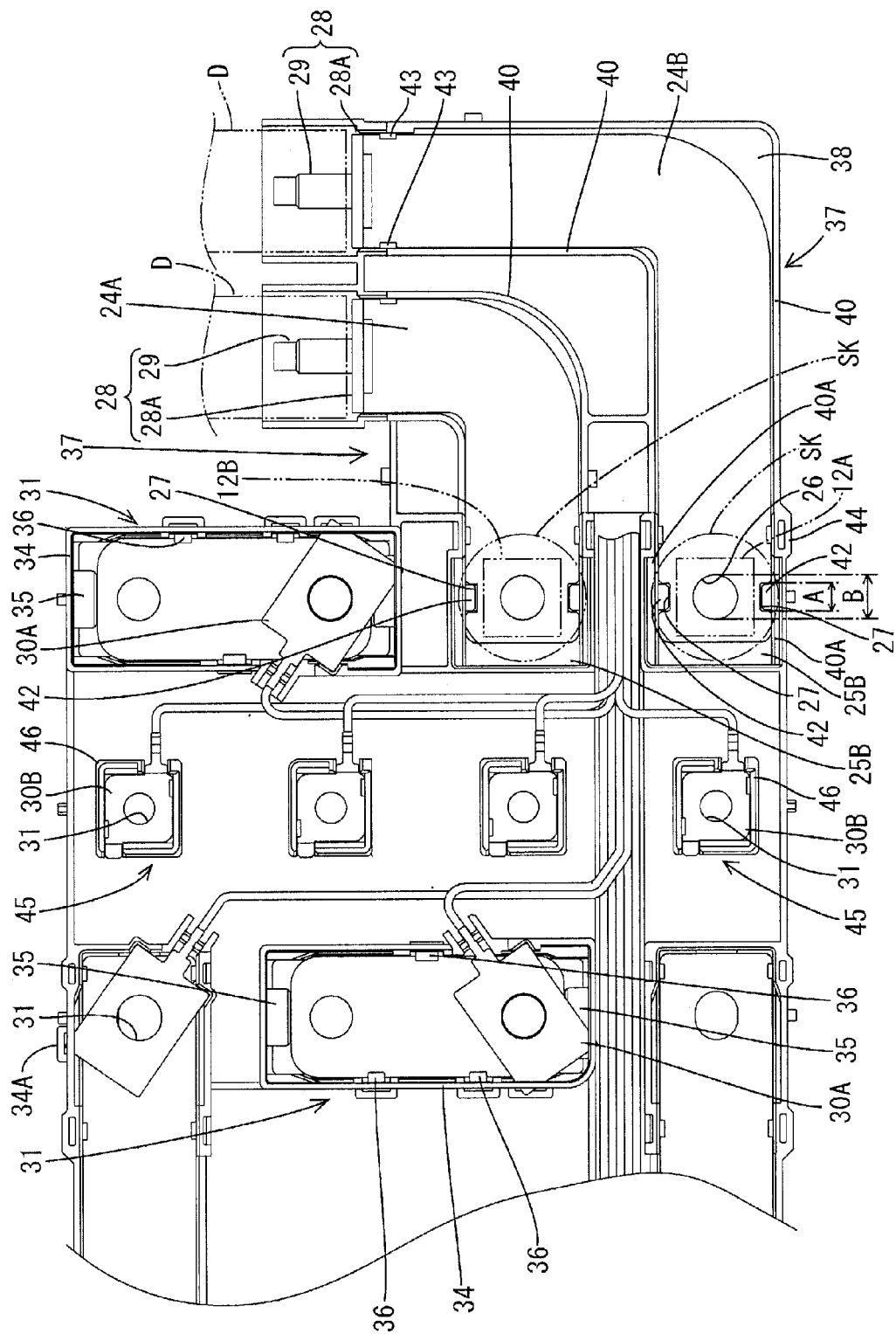
FIG. 4 is a view of the battery wiring module of FIG. 3 enlarging the vicinity of the second connecting members.
Figure 5:
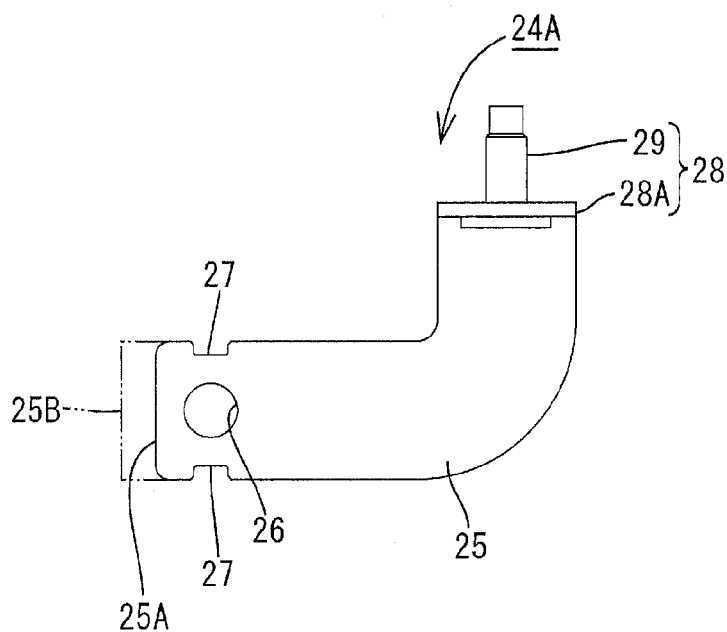
FIG. 5 is a plan view showing one of the second connecting members.
Figure 6:
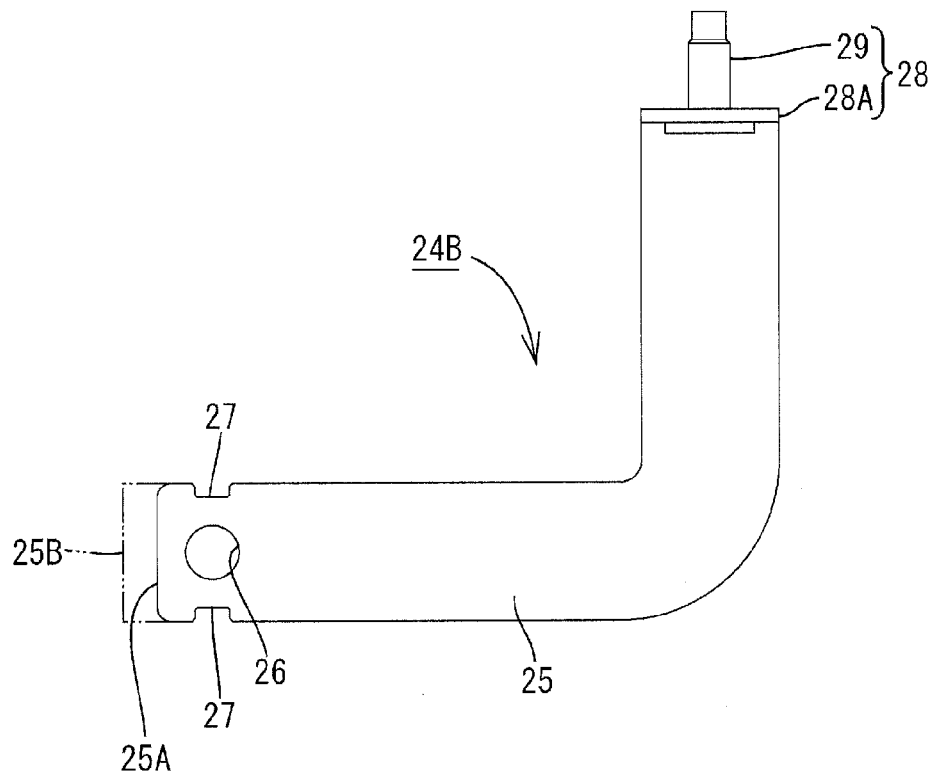
FIG. 6 is a plan view showing the other one of the second connecting members.

The second connecting members 24A, 24B are made of, for example, metal, such as copper, copper alloy, stainless steel (SUS), or aluminum. As shown in FIG. 4, one end of each of the second connecting members 24A, 24B is connected to the electrode terminal 12A, 12B at one end of the serial connection of the electric cells 11, with the other end being connected to one of the external conductive members D, and as shown in FIGS. 5 and 6, the second connecting members 24A, 24B also include a plate-shaped main portion 25 extending in an L-shape in parallel with the upper surfaces of the electric cells 11 and an external connecting portion 28 formed at one end of the main body 25 for connecting to an external device.

The external conductive members D are terminals of the cables connected to devices, such as an external inverter.

The main portions 25 have a relatively large right-left dimension to connect to the external conductive members D and are bent rearward (perpendicularly) on the right side.

Formed in the left end (the one end) of each main portion 25 is an insertion hole 26 into which the shank of a bolt is inserted.

The left end of the main portion 25 (the end edge to which the electrode terminal 12A, 12B at one end of the serial connection is connected) forms a trimmed portion 25A (where portions corresponding to predetermined areas of both right and left ends are trimmed) that creates a gap inside a partition wall 40 to be described below.

The trimmed portions 25A are formed by removing from the second connecting members 24A, 24B the areas 25B through which relatively little electric current is assumed to flow.

More particularly, as shown in FIG. 4, the trimmed portions 25A are the areas of the main portions 25 that are assumed to come into contact with the electrode terminals 12A, 12B through which large electric currents flow, such that areas of the main portions within the partition walls 40 and outside of the areas that come into contact with the electrode terminals 12A, 12B are trimmed.

A pair of concave engaged portions 27 (an example of "engaged portions" which are elements of the present invention) is formed in both side edges of each main portion 25 in the direction of its connection and on both sides of the insertion hole 26, by cutting out rectangles (in a step-like shape) elongated in the direction of the connection from the above-mentioned side edges (so that the width dimension of the main portion 25 is reduced in a stepped manner). The corners at which the width of the concave engaged portions 27 is reduced in a stepped manner are slightly rounded in a tapered manner.

The cutout depth of the concave engaged portions 27 is set so as not to reach areas where the concave engaged portions 27 come into contact with the electrode terminals 12A, 12B.

Moreover, the full length A of each engaged recess portion 27 in the right-left direction (the direction in which the second connecting member is connected) is located within (or contained in) the diameter B of the adjacent insertion hole 26 in the right-left direction (A<B in FIG. 4).

As shown in FIGS. 5 and 6, the external connecting portions 28 have a rising wall 28A rising at a right angle at the end of the main portion 25 and an external connecting terminal 29 perpendicularly projecting from the rear surface of the rising wall 28A.

The rising wall 28A has a rectangular plate shape, from the center of which projects the external connecting terminal 29 in the rearward direction.

The external connecting terminals 29 have a cylindrical shape and can be connected to the terminal of a cable coupled to a device (not shown), such as an external inverter. In the present invention, each external connecting terminal 29 is coupled to an external device. However, the external connecting terminals 29 can also be connected, for example, to an external conductive member, such as a (second) connecting member of the battery wiring module connected to the electrode terminal at an end of the serial connection of the electric cells of a separate battery module.

As shown in FIG. 4, each voltage detection terminal 30A is set on top of one end of a first connecting member 22, whereas each voltage detection terminal 30B is accommodated in a detector accommodating portion 45 to be described below. The terminals 30A, 30B both include, in the rear of a rectangular plate portion, a crimp portion to which a voltage detection wire W is crimped. Formed at the center of the flat plate portion is a circular insertion hole 31 into which the shank of a bolt can be inserted. The core wire exposed at one end of the voltage detection wire W is crimped to the crimp portion.

The voltage detection wires W are connected to a battery ECU (not shown). The battery ECU includes an on-board microcomputer, chip, or the like with a known configuration to perform the functions of detecting the voltages, currents, temperatures, etc., of the electric cells 11 and controlling the charging and discharging of each electric cell 11.

The resin protector 32 is made of synthetic resin and includes first holding portions 33 that hold the first connecting members 21, second holding portions 37 that hold the second connecting members 24A, 24B, and the detector accommodating portions 45 that accommodate the voltage detection terminals 30A, 30B.

Each first holding portion 33 is formed with a length corresponding to the length of the first connecting member 21 and includes a prismatic partition wall 34 that surrounds the first connecting member 21 mounted on the base plate and a plurality of dislodgement prevention lugs 36 that prevent the connecting member from being dislodged from the first holding portion 33.

Openings 39 (not shown) are formed in the base plate in the locations of the electrode terminals 12A, 12B, where there is no base plate.

The partition walls 34 are formed with a sufficient height to prevent shorting caused by tools and the like coming into contact with electrode terminals 12A, 12B and the short connecting member 22.

Provided at the ends of the partition wall 34 in the direction of the connection of the first connecting member 21 are positioning portions 35 for positioning the first connecting member 21 in the direction of the connection.

The positioning portions 35 protrude inwardly from the inner surfaces of the partition wall 34 at approximately the same height as the first connecting member 21 to abut against the first connecting member 21.

Formed in the partition wall 34 is a recess portion (or recess portions) that diverts the partition wall 34 such that a proximal corner (or proximal corners) of the rectangular plate portion of the voltage detection terminal 30A set on top of the first connecting member 21 can be fitted in the recess portion (or recess portions). Additionally formed in the partition wall 34 are a through-hole or through-holes (not shown) to allow a distal corner (or corners) of the plate portion to penetrate the wall and an auxiliary wall 34A that prevents the through-hole from being exposed to the outside.

The dislodgement prevention lugs 36 are adapted to be deformable by providing U-shaped cutouts in the partition walls 34 and formed with a slant thickness that is increasingly larger towards the lower end thereof. The first connecting members 21 are prevented from being dislodged by being set below the nail portions of the dislodgement prevention lugs 36.

Figure 7:
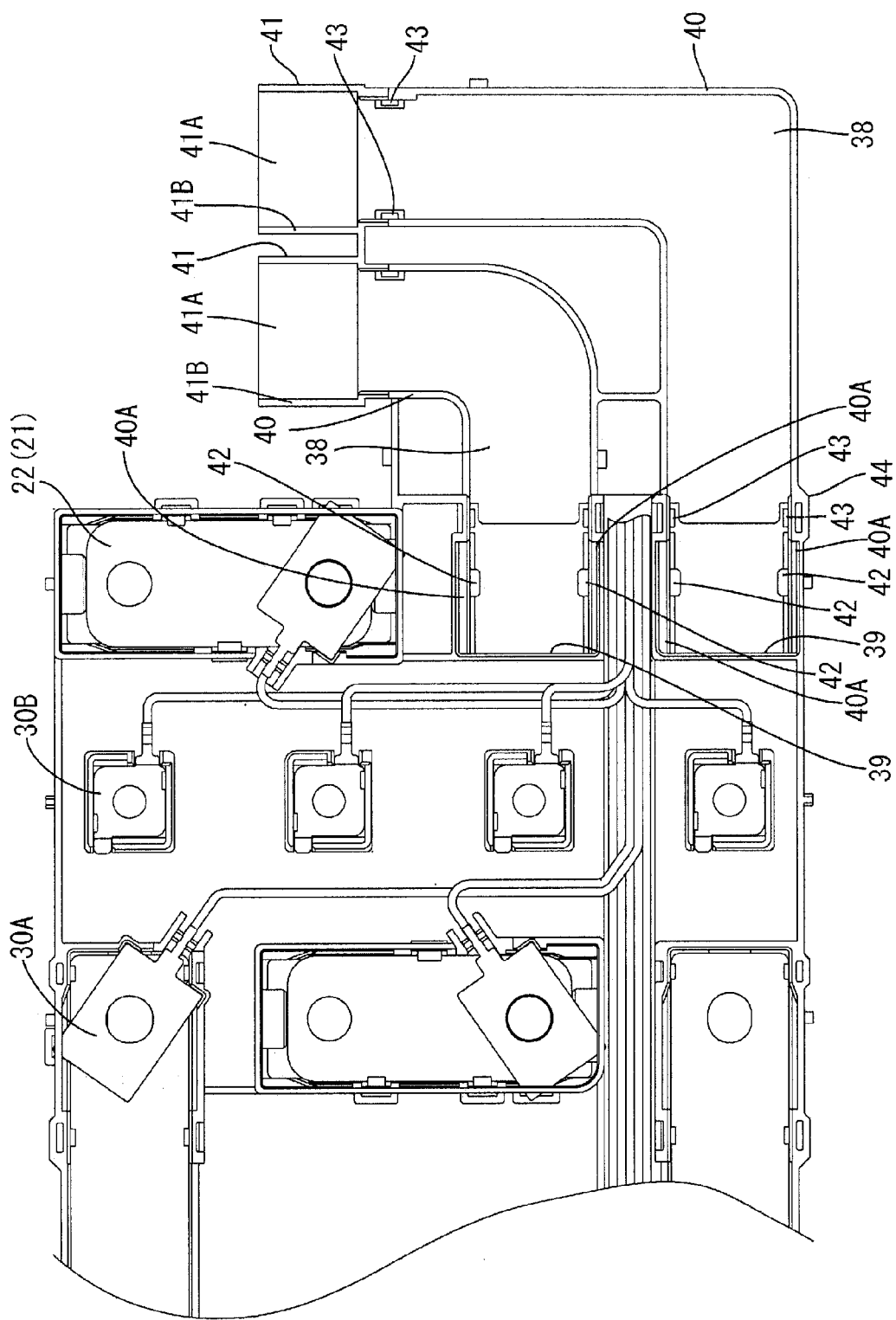
FIG. 7 is a plan view of FIG. 4 showing the second connecting members removed.

As shown in FIG. 7, the second holding portions 37 are provided with lengths corresponding to the lengths of the second connecting members 24A, 24B, with their right end sections bent rearward at an approximate right angle to conform to the shapes of the second connecting members 24A, 24B. The second holding portions 37 each include a base plate 38 on which a second connecting member 24A, 24B is mounted, a partition wall 40 that surrounds the second connecting member 24A, 24B and is opened on one end, convex engaging portions 42 that prevent the movement (displacement) of the second connecting member 24A, 24B in the direction of the connection of the second connecting member 24A, 24B by engaging the concave engaged portions 27, and a plurality of dislodgement prevention lugs 43 that prevent the second connecting member 24A, 24B from being dislodged from the second holding portions 37.

Openings 39 (not shown) are formed in the base plate 38 in the locations of the electrode terminals 12A, 12B, where there is no base plate.

The partition walls 40 are formed with a sufficient height to prevent shorting caused by tools and the like coming into contact with electrode terminals 12A, 12B and the short connecting member 22, and the ends of the partition walls 40 to which the external conductive members D are connected are open without being partitioned by the partition wall 40.

The ends of the base plate 38 and the partition wall 40 to which the external conductive member D is connected are formed into a connecting portion 41 in which the base plate 38 is lowered stepwise and the width dimension of the partition wall 40 is enlarged stepwise.

The external conductive member D can be fitted into the widened base plate 41A and the widened partition wall 41B of the connecting portion 41.

Provided in the interior surface of the partition wall 40 on the opening 39 are thinned portions 40A that are thinned so as not to abut against a socket (the circumference of the socket is indicated by the reference symbol SK in FIG. 4) into which a bolt is fitted and turned during bolt fastening.

The thinned portions avoid abutting against socket SK as the partition wall 40 is thinned down from its upper edge to a level slightly lower than the level to which socket SK comes down to during bolt fastening (a position upwardly spaced apart from the second connecting member by a predetermined dimension).

The convex engaging portions 42 are formed in the positions corresponding to the concave engaged portions 27 of the second connecting members 24A, 24B. The dimension of the protrusion of the convex engaging portions 42 is slightly smaller than the cutout depth dimension of the concave engaged portions 27 as measured from the side surfaces of the second connecting members 24A, 24B. The vertical position of the convex engaging portions 42 is the same as that of the second connecting members 24A, 24B. The corners of the convex engaging portions 42 are rounded in a tapered manner.

The right-left center of the convex engaging portions 42 is approximately aligned with the axial centers of the insertion holes 26 of the second connecting members 24A, 24B.

The dislodgement prevention lugs 43 are adapted to be deformable by providing U-shaped cutouts in the partition walls 34 and formed with a slant thickness that is increasingly larger towards the lower end thereof. The second connecting members 24A, 24B are prevented from being dislodged by being set below the nail portions of the dislodgement prevention lugs 43. Formed in the outer surfaces of the partition walls 40 where the dislodgement prevention lugs 43 are located are auxiliary walls 44 that prevent the cutouts that form the dislodgement prevention lugs 43 from being exposed.

Upon accommodating the second connecting members 24A, 24B in the second holding portions 37 thus constructed, the convex engaging portions 42 engage (or fit in) the concave engaged portions 27 while leaving gaps corresponding to the areas 25B defined between the partition walls 40 and the trimmed portions 25A of the second connecting members 24A, 24B.

Figure 8:
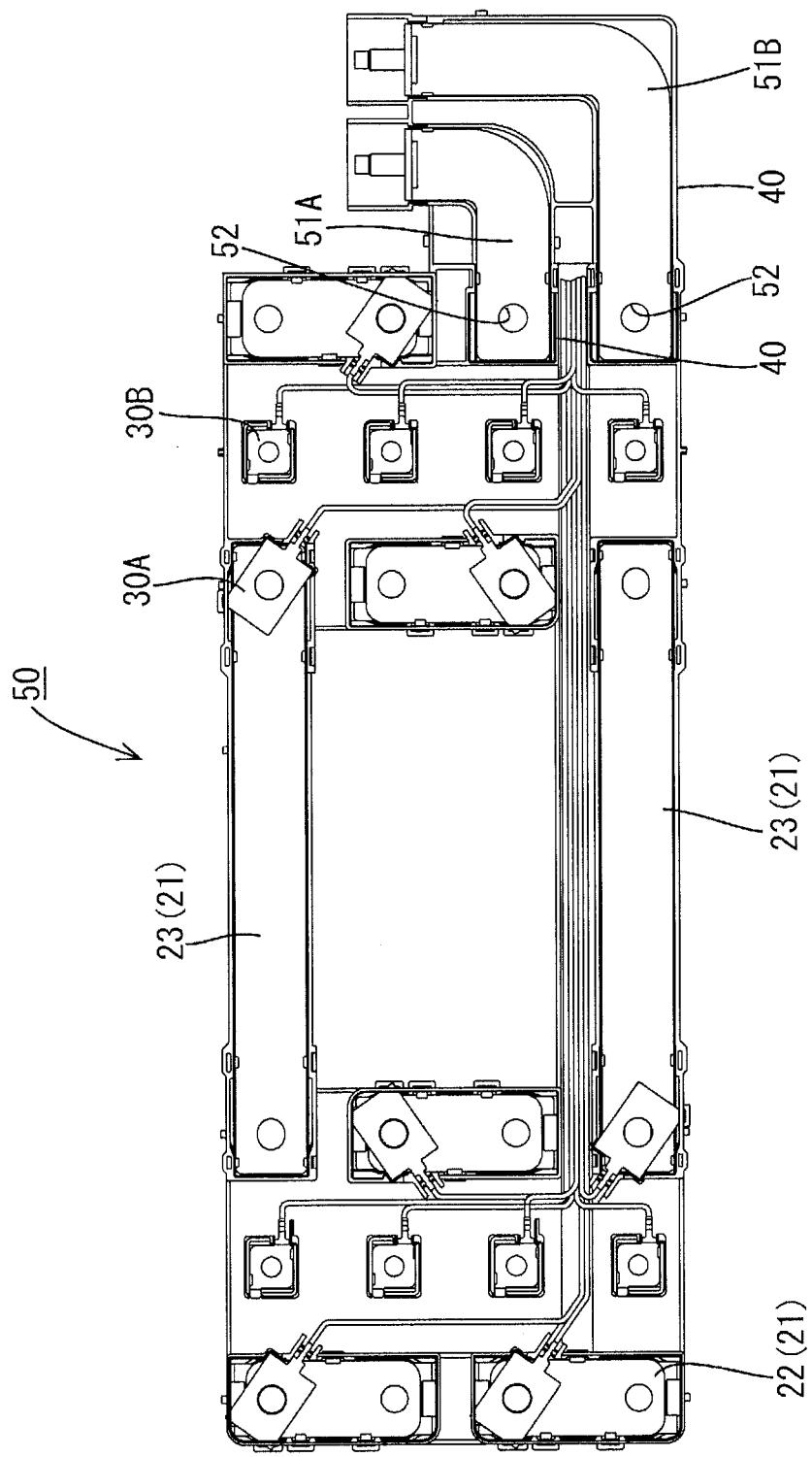
FIG. 8 is a plan view showing a battery wiring module that serves as a comparative example.

For example, as shown in FIG. 8 as a comparative example, assume that no concave engaged portions 27 or convex engaging portions 42 are provided in a battery wiring module 50 that includes second connecting members 51A and 51B and that the left ends of the second connecting members 51A and 51B are fitted in and positioned without any gaps between the second connecting members and the partition walls 40. In this case, dimensional tolerance needs to be provided between the second connecting members 51A and 51B and the partition walls 40 to allow the second connecting members 51A and 51B to be fitted in, and the dimensional tolerance for the diameter of the insertion holes 52 needs to be determined according to the foregoing dimensional tolerance. This, however, tends to increase the diameter of the insertion holes 52. Conversely, according to the present embodiment, the second connecting members 24A, 24B are positioned by the engagement between the convex engaging portions 42 and the concave engaged portions 27, which are located close to the insertion holes 26. As this allows for reduction of the dimensional tolerance for the diameter of the insertion holes 26, the diameter of the insertion holes 26 is set slightly smaller than that of the insertion holes 52 of the comparative example.

As shown in FIG. 4, the detector accommodating portions 45 have recess portions formed therein in which voltage detection terminals 30B are fitted, and formed in each recess portion is a rectangular opening (not shown) through which a voltage detection terminal 12C is passed. The crimp portion of each voltage detection terminal 30B is passed through a groove formed by cutting out a surrounding wall 46 of the detector accommodating portion 45, and the voltage detection wire W crimped to the crimp portion is routed to the external battery ECU along the top of the tubular portions aligned though holding portions 33, 37, and detector accommodating portions 45.

How the battery wiring module 20 is assembled will be described below.

The first connecting members 21 are placed in the first holding portions 33 of the resin protector 32. Also, the second connecting members 24A, 24B are mounted on the base plates 38 in a manner that fits the concave engaged portions 27 to the convex engaging portions 42 of the resin protector 32. At this moment, as the second connecting members 24A, 24B are being fitted in the partition walls 40 from the above, the dislodgement prevention lugs 36 are deformed, and once the second connecting members 24A, 24B have passed over the lower edges of the dislodgement prevention lugs 36, the dislodgement prevention lugs 36 restore their shape from the deformation and retain the second connecting members 24A, 24B so that the second connecting members 24A, 24B may not be dislodged from the second holding portions 37.

Additionally, the voltage detection terminals 30A, 30B with voltage detection wires W crimped thereto are accommodated in the detector accommodating portions 45, and the voltage detection wires W are routed through first and second holding portions 33, 37, and detector accommodating portions 45 and gathered on the right or left side of the resin protector 32.

This completes the assembly of the battery wiring module 20 (FIG. 3).

The battery module 10 is assembled by mounting the battery wiring module 20 on the electric cells 11 arranged in a plurality of rows and inserting and tightening the shanks of bolts (not shown) into the insertion holes 26 of the connecting members (FIG. 1).

The present embodiment performs the following operations and effects:

(1) According to the present embodiment, the battery wiring module 20 comprises: first connecting members 21 that connect adjacent positive and negative electrode terminals 12A, 12B of a plurality of electric cells 11 to serially connect the plurality of electric cells 11; second connecting members 24A, 24B, one end of each of which is connected to the electrode terminal 12A, 12B at one end of the serial connection and the other end of each of which is connected to an external conductive member; and a resin protector 32 that holds the first connecting members 21 and the second connecting members 24A, 24B. The resin protector 32 includes first holding portions 33 that hold the first connecting members 21 and second holding portions 37 that hold the second connecting members 24A, 24B. Concave engaged portions 27 (engaged portions) are provided in the second connecting members 24A, 24B and convex engaging portions 42 (engaging portions) are provided in the second holding portions 37 for engaging the concave engaged portions 27 to limit the movement of the second connecting members 24A, 24B.

If connecting members are connected to external conductive members D as in the case of the second connecting members 24A, 24B and if the second connecting members 24A, 24B are positioned by sandwiching the end edges of the second connecting members 24A, 24B located in the direction of their connection, the structure tends to be too complicated to achieve high dimensional accuracy. In addition, if connecting members are connected to external conductive members D as in the second connecting members 24A, 24B, such connecting members tend to be longer in the direction of their connection than the first connecting members 21 and thus susceptible to larger dimensional errors due to their greater length in the direction of their connection, which in turn requires larger dimensional tolerance.

According to the present embodiment, however, the movement of the second connecting members 24A, 24B can be limited by the engagement between the convex engaging portions 42 and the concave engaged portions 27. Therefore, even if the second connecting members 24A, 24B are elongated, the present embodiment may achieve higher dimensional accuracy in their positioning with respect to the positions of the convex engaging portions 42 and the concave engaged portions 27, compared with the structure in which the second connecting members 24A, 24B are positioned by sandwiching the second connecting members 24A, 24B with the partition walls. This provides for achieving high dimensional accuracy in positioning the connecting members that are connected to the electrode terminals 12A, 12B at the ends of the serial connection of the electric cells 11 arranged in a plurality of rows.

Furthermore, according to the present embodiment, as the second connecting members 24A, 24B are positioned by the engagement between the convex engaging portions 42 and the concave engaged portions 27, the second connecting members 24A, 24B can be positioned in the direction of their connection without extending the end edges of the second connecting members 24A, 24B to the partition walls 40. As this serves to shorten the second connecting members 24A, 24B in the direction of their connection, the amount of material used for the second connecting members 24A, 24B (copper alloy, etc.) can be reduced.

(2) The second holding portions 37 include a base plate 38 on which a second connecting member 24A, 24B is mounted, and a partition wall 40 that separates the second connecting member 24A, 24B from the outside, and concave engaged portions 27 (engaged portions) are provided in the side edges of the second connecting members 24A, 24B in the direction of their connection while convex engaging portions 42 (engaging portions) are provided in the partition walls 40.

This facilitates simplification of the structures of the second connecting members 24A, 24B and the second holding portions 37, compared with, for example, the structure in which through-holes are provided in the second connecting members 24A, 24B as engaged portions and pins protrude from the base plates 38 as engaging portions to be inserted into the through-holes.

(3) The concave engaged portions 27 (engaged portions) are cutouts formed by cutting out portions of the side edges of the second connecting members 24A, 24B in the direction of their connection while the convex engaging portions 42 (engaging portions) protrude inwardly from the partition walls 40 to corresponds to the cutouts.

This can reduce the amount of material used for the second connecting members 24A, 24B compared with the case in which convexes are formed on the second connecting members 24A, 24B.

(4) The second connecting members 24A, 24B have insertion holes 26 formed therein into which electrode terminals or the shanks of bolts can be inserted and the concave engaged portions 27 (engaged portions) are formed adjacent to the insertion holes 26.

As this achieves high dimensional accuracy in positioning the second connecting members 24A, 24B in the direction of their connection, it also achieves high dimensional accuracy in positioning the insertion holes 26. This can reduce the tolerance of the diameter of the insertion holes 26, thus reducing the electrical resistance between the electrode terminals 12A, 12B and the second connecting members 24A, 24B.

(5) The concave engaged portions 27 (engaged portions) are formed within the diameter of the insertion holes 26 in the direction of the connection of the second connecting members 24A, 24B.

This allows for even higher dimensional accuracy in the positioning of the insertion holes 26.

(6) The insertion holes 26 have a circular shape and the midpoints of the concave engaged portions 27 (engaged portions) in the direction of the connection of the second connecting members 24A, 24B are aligned with the axial centers of the insertion holes 26.

This allows for even higher dimensional accuracy in the positioning of the insertion holes 26.

(7) The convex engaging portions 42 (engaging portions) are not spaced apart any farther than a predetermined dimension on different sides of the electric cells 11 with respect to the second connecting members 24A, 24B.

In this way, even if the areas of the second connecting members 24A, 24B (inside the partition walls 40 surrounding the second connecting members) are made small, socket SK (a tool) for fastening the second connecting members 24A, 24B is prevented from coming into contact with the convex engaging portions 42 when the tool is brought within the partition wall 40.

Other Embodiments

The present invention is not limited to the embodiments described in connection with the foregoing description and drawings. For example, the following embodiments also fall under the technical scope of the present invention.

(1) In the foregoing embodiment, although the concave engaged portions 27 are provided in the second connecting members 24A, 24B and the convex engaging portions 42 are provided in the partition walls 40, other embodiments are possible as long as the second connecting members 24A, 24B can be positioned. For example, convex portions may be provided in the second connecting members 24A, 24B while concave portions that fit on the abovementioned convex portions may be provided in the partition walls 40.

Moreover, for example, rather than providing positioning structures on the side edges of the second connecting members 24A, 24B in the direction of their connection, for example, through-holes may be provided in the second connecting members 24A, 24B as engaged portions and pins may be erected on the base plates 38 as engaging portions to be inserted into the through-holes.

(2) The positions of the concave engaged portions 27 and the convex engaging portions 42 in the direction of their connection of the second connecting members 24A, 24B are not limited to those in the foregoing embodiment. For example, the engaged portions and the engaging portions may be positioned further apart from the insertion holes 26 than in the foregoing embodiment.

(3) In the foregoing embodiment, the terminals 12A-12C of the electric cells 11 are of a nut type fastened with separate bolts. Instead, terminals 12A-12C may be rods with grooves threaded in their peripheral surfaces, such that separate nuts may be fastened on the shanks of the electrode terminals passed through the insertion holes 22A, 23A, 26 of the connecting members 21, 24A, 24B, thereby securing the connecting members 21, 24A, 24B.

(4) The number (of tiers and rows) of electric cells 11 for constituting the battery module 10 is not limited to that according to the foregoing embodiment. Furthermore, the shape of the battery wiring module 20 may also be decided according to the number of electric cells 11.

(5) In the foregoing embodiment, a single (integrated) plate-shaped resin protector 32 is used to form the battery wiring module 20. Instead, a plurality of connecting units that hold the connecting members 21, 24A, 24B may be connected to form the resin protector 32.

The invention claimed is:

1. A battery wiring module comprising:
   first connecting members that connect adjacent positive and negative electrode terminals of a plurality of electric cells to serially connect the plurality of electric cells;
   second connecting members, one end of each of which is connected to the electrode terminal at one end of the serial connection and the other end of each of which is connected to an external conductive member; and
   a resin protector that holds the first connecting members and the second connecting members, the resin protector including:
   first holding portions that hold the first connecting members, and
   second holding portions that hold the second connecting members,
   wherein engaged portions are provided in the second connecting members and engaging portions are provided in the second holding portions to engage the engaged portions such that the movement of the second connecting members is limited.

2. The battery wiring module according to claim 1, wherein the second holding portions include a base plate on which the second connecting members are mounted and a partition wall that separates the second connecting member from the outside; and
   the engaged portions are provided in side edges of the second connecting members in the direction of their connection and the engaging portions are provided in the partition walls.

3. The battery wiring module according to claim 2, wherein the engaged portions are cutouts formed by cutting out portions of the side edges, with respect to the connection direction, of the second connecting members-members; and
   the engaging portions protrude inwardly from the partition walls, in correspondence to the cutouts.

4. The battery wiring module according to claim 2, wherein insertion holes into which the electrode terminals or the shanks of bolts are inserted are formed in the second connecting members; and
   the engaged portions are formed adjacent to the insertion holes.

5. The battery wiring module according to claim 4, wherein the engaged portions are formed within the diameter of the insertion holes in the direction of the connection of the second connecting members.

6. The battery wiring module according to claim 4, wherein the insertion holes have a circular shape; and
   the midpoints of the engaged portions with respect to the direction of the connection of the second connecting members are aligned with the axial centers of the insertion holes.

7. The battery wiring module according to claim 2, wherein the engaging portions are not spaced apart any farther than a predetermined dimension on different sides of the electric cells with respect to the second connecting members.

* * * * *